United States Patent Office 3,451,141
Patented June 24, 1969

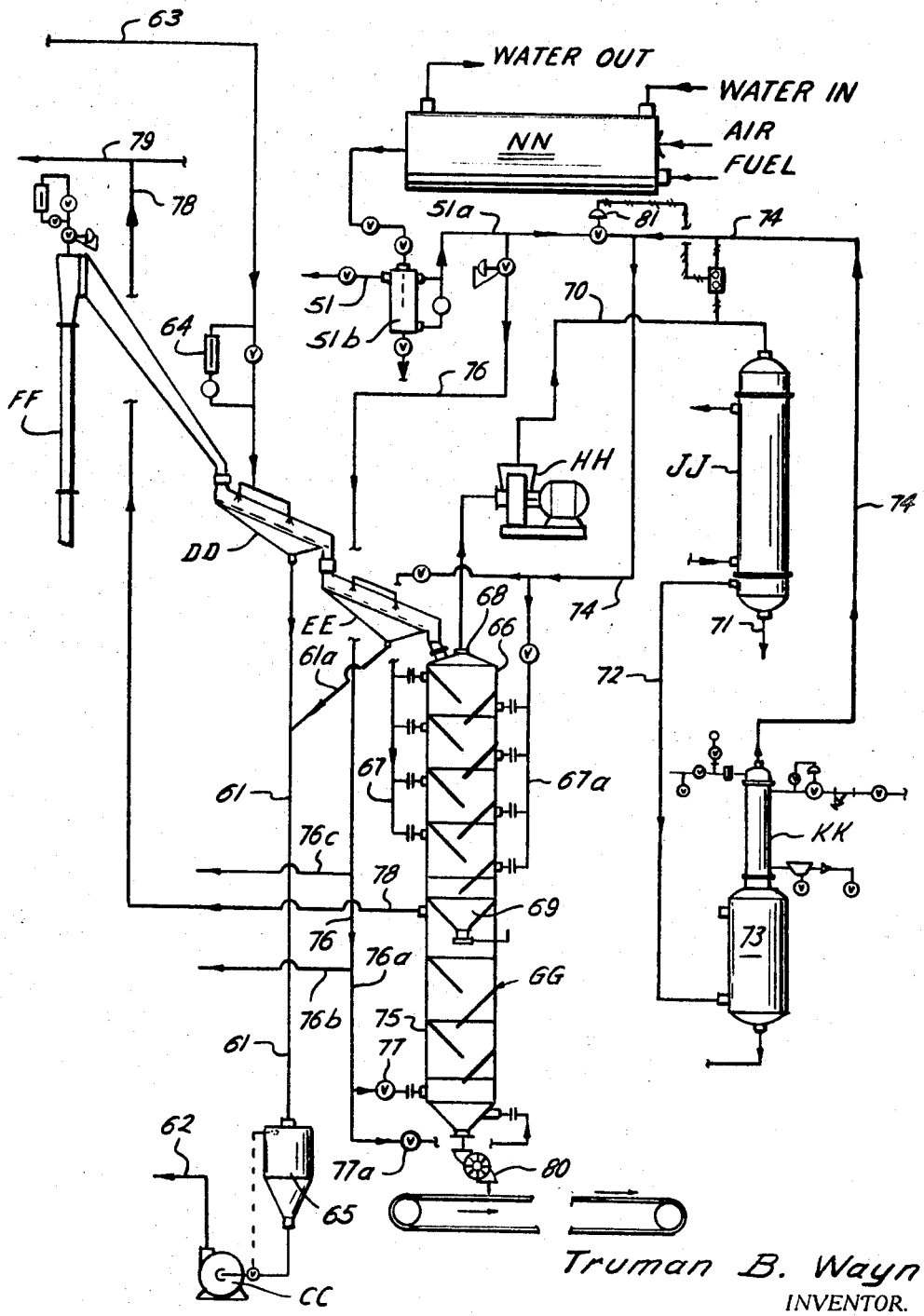

3,451,141
RICE DESOLVENTIZING APPARATUS AND METHOD
Truman B. Wayne, P.O. Box 13086,
Houston, Tex. 77019
Original application Feb. 24, 1966, Ser. No. 529,814.
Divided and this application Nov. 13, 1967, Ser. No. 682,264
Int. Cl. F26b 3/14, 17/14
U.S. Cl. 34—36                  9 Claims

ABSTRACT OF THE DISCLOSURE

Apparatus and method for desolventizing solvent extracted milled rice. The apparatus contemplates two towers or columns, one of which is above the other, and through which the solvent extracted milled rice is flowed or cascaded by gravity force and therein contacted with a desolventizing gaseous medium to remove the solvent therefrom. The apparatus and method avoids the use of rotors and the like which have heretofore been used and which unnecessarily break the relatively fragile milled rice grains.

---

This application is a divisional application of previously filed and copending application Ser. No. 529,814, filed Feb. 24, 1966, entitled, Rice Milling Process by the same inventor.

This invention relates to an apparatus and method for desolventizing solvent extracted milled rice. More particularly, the invention relates to an apparatus and method for desolventizing solvent extracted milled rice wherein the rice grains are handled in such a manner as to reduce the tendency for the rice kernels to break up during the desolventizing process.

There has now come into use various apparatus and methods for solvent extracting and wet milling rice, which apparatus and processes are generally taught in U.S. Letters Patent No. 3,261,690, No. 3,165,134, No. 3,217,769 and No. 3,330,666. Hence, there has arisen a need for a method and apparatus to remove the solvent from the milled rice grains upon completion of the milling step.

Many apparatus have been developed for the purpose of desolventizing various grain products, such as soybean meal, and the like. Examples of prior art apparatus and methods are taught in the following U.S. Letters Patent No. 2,691,830, No. 2,618,560, No. 2,571,143 and No. 2,811,539.

However, rice kernels are quite fragile, particularly in the milled condition, and hence, must be treated with great care. Heretofore, apparatus which have been used for desolventizing purposes generally have contemplated the use of rotors, screw conveyors and the like for moving the product to be desolventized through the desolventizing zone. All of these prior art apparatus have various shortcomings in that they subject the rice grains to considerable agitation and high temperatures, resulting in an end product of inferior quality as compared with rice desolventized in accordance with the present invention.

It is therefore an object of this invention to provide an improved rice desolventizing apparatus and method which provides a solution to the foregoing problems, and which can be carried out with a minimum of supervision and time.

Still another object is to provide an improved desolventizing procedure following an extractive milling process which minimizes chalking and development of fissures in kernels of the rice and removes residual solvent with sufficient completeness to meet Food and Drug Administration requirements.

An improved desolventizing procedure for the clean rice is contemplated which effects substantial savings in equipment costs, and produces a desolventized clean rice of improved appearance and free from residual solvent. The present process also avoids problems in processing due to a large quantity of fine bran and polish residues remaining on the finished rice.

Briefly stated, the apparatus of this invention contemplates a first tower defining a generally vertically extending first chamber with means for cascading the milled rice by gravity force downwardly therethrough. It also contemplates means for passing a first desolventizing gaseous medium through the first chamber and in intimate contact with the rice therein to thereby vaporize solvent therefrom. The apparatus includes a second tower defining a generally vertically extending second chamber which second tower is spaced generally below the first tower. It also includes means for gravity flowing the rice from the bottom of the first chamber downwardly through the second chamber, and means for passing a second desolventizing gaseous medium through the second chamber and in intimate contact with the rice therein to thereby vaporize solvent therefrom.

Briefly stated, the method of this invention for desolventizing solvent extracted milled rice contemplates cascading the rice generally downwardly through a generally vertically extending first chamber. At the same time, a first desolventizing gaseous medium is passed through the first chamber at a plurality of vertically spaced apart points to thereby contact the rice therein with the first medium. The first medium is thereafter withdrawn from the first chamber with the vaporized solvent contained therein. Vaporized solvent is then condensed from the first medium which is then heated and recycled back to the first chamber. The rice is flowed by gravity force downwardly from the first chamber through a vertically extending second chamber spaced generally below the first chamber. A second desolventizing gaseous medium is passed through the second chamber to thereby contact the rice therein and remove additional solvent therefrom.

The desolventizing step preferably is conducted by passing the rice downward in a semi-fluidized bed exposed to warm inert gas, preferably combustion gases, for vaporizing solvent from the rice. Preferably warm inert gas containing solvent vapor from the desolventizer passes through a recycling system in which the gas is cooled, evaporated solvent contained therein is condensed and separated from the gas, and the gas is reheated and returned to the desolventizer. Such recycle of desolventizer gas prevents build-up of solvent vapor in the desolventizing gas to an explosive level, and assists in a very high rate of recovery of solvent from the used gas.

For some reason, at present unknown, a mixture of gases resulting from substantially perfect combustion of a hydrocarbon material, such as natural gas in air and containing as its principal components nitrogen, carbon dioxide and water vapor, decreases chalking of the rice during desolventizing and gives the rice a better appearance. Breakage of rice grains also is reduced by the downward cascading flow of the rice. It is believed, however, that this effect is due to the prevention of water loss from the outer layers of the milled kernel by the moisture content of the inert gas mixture.

Reference to the drawing will further explain the invention and in which FIG. 1 is a generally side elevation view, somewhat schematic in form, showing one presently preferred form of the apparatus of this invention and one means for carrying out the method of this invention.

Referring now to the drawing, solvent extracted milled rice which still contains small amounts of dilute, oil-containing solvent and some polish fines, is elevated to vibratory washer DD by means of elevator FF where it is successively washed with pure solvent obtained from solvent pipe 63 (from any convenient source). The solvent is preferably metered through rotameter 64 and is forced through the two spray headers at the termini of solvent pipe 63. The washings drain through pipe 61 to surge tank 65 which supplies pump CC. The washed rice, now substantially free of oil-containing solvent and polish fines but still wet with fresh rinse solvent, passes to vibratory desolventizer EE where most of the remaining surface and interstitial solvent is shaken off and drains through pipe 61a to pipe 61 and thence to surge tank 65.

The cleanly milled rice, which still contains some absorbed and surface solvent, is then discharged to rice desolventizer GG which comprises a vertical column having an upper section 66 with internal staggered baffles, oppositely placed recycle gas manifolds 67 and 67a, an exhaust stack 68 and a hoppered bottom 69 which is equipped with a slide gate. The column is filled and recycle gas blower HH is started to establish desolventizing gas circulation into this blower from recycle gas stack 68 into exhaust duct 70 and thence into recycle gas condenser JJ where all or any desired part of the solvent in the recycle gas may be condensed and drained to pipe 71 which delivers to a solvent separator (not shown). The remaining gas, now saturated with respect to the solvent vapor and moisture, passes through duct 72 to the knockout section 73 of recycle gas heater KK and thence into the tubular heater section where it is superheated to a temperature sufficient to have evaporative ability when recycled to upper section 66 of the rice desolventizer through duct 74 which supplies the recycle gas manifolds 67 and 67a. To prevent cracking of the rice, the entering gas temperature is preferably within the range of 120°–150° F. The gas leaving the desolventizer to be recycled usually is at a temperature of 95°–110° F.

When the rice in upper section 66 is sufficiently desolventized, the slide gate in hopper bottom 69 is opened and circulation into lower deodorizer section 75 of the apparatus is established. As desolventized rice enters section 75, additional solvent-wet rice enters the upper section 66. When both column sections are full, inert gas is admitted from pipe 76a through flow control valves 77 and 77a. The inert gas is forced upwards through the rice to remove the last traces of solvent, and is exhausted through stack 78 into main vent header 79 which collects solvent vapors from the high point of all apparatus in which they occur. The main vent header terminates to vent condenser (not shown) which condenses most of the solvent vapors and delivers the liquid solvent to solvent separator (not shown). Any uncondensed solvent vapors are sent from the vent condenser to a solvent vapor recovery system (not shown) which may be of any conventional type.

The desolventizer, deodorized milled rice product is then delivered through rotary vapor lock 80 to a suitable conveyor and thence to the finishing house where it is graded, coated and polished if desired and sent to storage or packing. These latter operations are conventional practices not within the scope of this invention.

Inert gas generator NN comprises a convention apparatus for the exact combustion of a fuel, preferably natural gas, so that the combustion produces are primarily nitrogen, carbon dioxide, water vapor and traces of oxygen, unburned hydrocarbons and carbon monoxide which are delivered at a pressure of from 5 to 10 p.s.i. The main inert gas ducts 51 and 51a originate from water knockout pot 51b, and through several branches supply both the bran desolventizer (not shown) and the rice desolventizer and deodorizer GG with a substantially oxygen-free inert atmosphere which will prevent explosions of solvent vapor in all apparatuses throughout the process. When drawn from branch inert gas pipes 76, 76a, 76b and 76c, it is preferably under a moderate pressure of 2 to 3 p.s.i. It will, therefore, flow freely through the deodorizer section 75 of apparatus GG and into other apparatuses and vessels in which atmospheric pressure or a slight negative pressure exists due to vent connections from them to the main vent header which in turn connects to the vent condenser (not shown) and from thence to the vapor recovery system (not shown) in which there is a final vent. A pressure of 5 to 6 p.s.i. in the main inert gas ducts 51 and 51a is sufficient to deliver inert gas through differential pressure control valve 81 into the return recycle gas duct 74, to maintain a constant pressure differential between them and the recycle blower's discharge line 70. Thus, a constant driving force is provided through the desolventizing system, regardless of the pressure drop through recycle condensing and gas heating apparatuses due to condensation of solvent vapor.

The solvent which is used in the solvent extractive milling of rice may be any suitable commercially available type such as hexane, heptane, trichloroethylene, ethylene, dichloride, substantially anhydrous isopropanol, or the like, which are commonly used in solvent extraction processes. Constant boiling azeotropes comprising one or more solvents with small proportions of water are also contemplated. Hexane is the preferred extractive solvent because of its ready availability and low cost, and its ready recovery by evaporation and steam stripping. Since rice is a special case requiring careful handling to preserve it as whole grains to the greatest possible extent, it is referred that it be desolventized in a baffled vertical column type desolventizer similar to that illustrated in the drawing wherein the fully washed, solvent wet, clean rice enters at the upper part of the desolventizer and is contacted by a pressurized stream of inert combustion gas, or mixture of an inert gas and solvent and vapor which has been superheated to allow rapid vaporization and removal of the solvent from the rice mass as it moves downward in a slightly expanded bed in a state of incipient fluidization to promote rapid circulation of a desolventizing vapor within the moving bed of rice. The gases from the operation are sent in part or entirely through a recycle gas condenser and thence to a recycled gas heater before being returned as superheated recycled gas to the desolventizer. Since 90% to 95% of the total solids entering as brown rice are received and desolventized in this apparatus, it must be of high capacity to permit fast throughput in which the rice is not subjected to temperatures exceeding 140° F., as temperatures above this value result in heat checking and breakage of the rice.

Further modifications may be made in the invention as particularly described without departing from the scope thereof. Accordingly the foregoing description is to be construed as illustrative only and is not to be construed as a limitation upon the invention as described in the following claims.

What is claimed is:

1. In apparatus for desolventizing solvent extracted milled rice, the combination comprising:

a first tower defining a generally vertically extending first chamber;

means for cascading said milled rice by gravity force downwardly through said first chamber;

means for passing a first desolventizing gaseous medium through said first chamber and in intimate contact with said rice therein to thereby vaporize solvent therefrom, said means including a plurality of vertically spaced apart inlet ports communicating with said first chamber for admitting said first medium thereinto;

a second tower defining a generally vertically extending second chamber, said second tower being spaced generally below said first tower;

means for gravity flowing said rice from the bottom of said first chamber downwardly through said second chamber;

means for gravity flowing said rice from the bottom of said first chamber downwardly through said second chamber;

and means for passing a second desolventizing gaseous medium through said second chamber and in intimate contact with said rice therein to thereby vaporize solvent therefrom.

2. The invention as claimed in claim 1 wherein:
said means for passing said first desolventizing gaseous medium through said first chamber includes at least one outlet port spaced above at least one of said inlet ports, whereby flow of said first medium therebetween is generally upward.

3. The invention as claimed in claim 1 wherein:
said means for passing said second desolventizing gaseous medium through said second chamber includes an inlet port near the bottom of said second chamber and an outlet port near the top of said second chamber for passing said second medium generally upwardly through said second chamer.

4. The invention as claimed in claim 1 wherein:
said first tower is vertically aligned over said second tower and connected thereto.

5. The method of desolventizing solvent extracted milled rice, said method comprising the steps of:
cascading said rice generally downwardly through a generally vertically extending first chamber;
passing a first desolventizing gaseous medium into said first chamber at a plurality of vertically spaced apart points to thereby contact said rice with said first medium and vaporize solvent therefrom;
withdrawing said first medium from said first chamber with said vaporized solvent contained therein;
condensing vaporized solvent from said withdrawn first medium, heating and recycling said first medium to said first chamber;

flowing said rice by gravity force generally downwardly from said first chamber through a generally vertically extending second chamber spaced generally below said first chamber;
and passing a second desolventizing gaseous medium through said second chamber to thereby contact said second atmosphere with said rice and vaporize solvent therefrom.

6. The invention is claimed in claim 5 wherein:
said second medium includes inert gas as a major component thereof and is passed generally upwardly through said second chamber.

7. The invention as claimed in claim 5 wherein:
said first medium is passed through at least a portion of said first chamber in a generally upward direction.

8. The invention as claimed in claim 5 wherein:
inert gas comprises the major portion of said first medium upon introduction into said first chamber.

9. The invention as claimed in claim 8 wherein:
said first medium is at a temperature in the range from about 120° F. to 150° F. upon introduction into said first chamber and in the range from about 95° F. to 120° F. upon withdrawal therefrom.

References Cited

UNITED STATES PATENTS

| 2,361,151 | 10/1944 | Reed | 34—171 |
| 2,571,143 | 10/1951 | Leslie | 34—182 |
| 2,695,459 | 11/1954 | Hutchins | 34—37 XR |

KENNETH W. SPRAGUE, *Primary Examiner.*

U.S. Cl. X.R.

34—171